United States Patent [19]
Post

[11] Patent Number: 5,861,690
[45] Date of Patent: Jan. 19, 1999

[54] FAIL SAFE CONTROLLABLE OUTPUT IMPROVED VERSION OF THE ELECTROMECHANICAL BATTERY

[75] Inventor: Richard F. Post, Walnut Creek, Calif.

[73] Assignee: The Regents of the University of California, Oakland, Calif.

[21] Appl. No.: 810,392

[22] Filed: Mar. 3, 1997

[51] Int. Cl.⁶ .............................. H02K 19/26; H02K 7/02
[52] U.S. Cl. ................................. 310/74; 310/191
[58] Field of Search .......................... 310/74, 153, 191, 310/209; 290/15, 38 A; 322/4; 74/572

[56] References Cited

U.S. PATENT DOCUMENTS

| | | | |
|---|---|---|---|
| 5,446,319 | 8/1995 | Pawlowski | 310/15 X |
| 5,495,221 | 2/1996 | Post | 355/299 |
| 5,627,419 | 5/1997 | Miller | 310/74 |
| 5,705,902 | 1/1998 | Merritt et al. | 318/254 |

OTHER PUBLICATIONS

Richard F. Post, T. Kenneth Fowler, S. F. Post, "A High Efficiency Electromechanical Battery," UCRL–JC–110861, Lawrence Livermore National Laboratory, Livermore, California, Jun. 11, 1992.

Primary Examiner—Thomas M. Dougherty
Assistant Examiner—Judson H. Jones
Attorney, Agent, or Firm—John P. Wooldridge

[57] ABSTRACT

Mechanical means are provided to control the voltages induced in the windings of a generator/motor. In one embodiment, a lever is used to withdraw or insert the entire stator windings from the cavity where the rotating field exists. In another embodiment, voltage control and/or switching off of the output is achievable with a variable-coupling generator/motor. A stator is made up of two concentric layers of windings, with a larger number of turns on the inner layer of windings than the outer layer of windings. The windings are to be connected in series electrically, that is, their voltages add vectorially. The mechanical arrangement is such that one or both of the windings can be rotated with respect to the other winding about their common central axis. Another improved design for the stator assembly of electromechanical batteries provides knife switch contacts that are in electrical contact with the stator windings. The operation of this embodiment depends on the fact that an abnormally large torque will be exerted on the stator structure during any short-circuit condition.

13 Claims, 2 Drawing Sheets

FAIL SAFE CONTROLLABLE OUTPUT IMPROVED VERSION OF THE ELECTROMECHANICAL BATTERY

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to improvements to the electromechanical battery (EMB), and more specifically, it relates to a fail safe version of the EMB with added power control capabilities.

2. Description of Related Art

A particular configuration of permanent magnets (the "Halbach Array") and of stator windings is known, where the windings are locating within a re-entrant insulating cylinder that forms a vacuum barrier, so that the windings are located "in air," i.e., not in an evacuated space. For the purpose of this disclosure, the important features of this design are two: (i) the generator/motor assembly is entirely ironless in nature, not involving any ferromagnetic material and (ii), the dipole field produced by the Halbach Array is highly uniform within the region bounded by the magnets. The consequence of (i) is that the coupling of flux within the windings is accurately determined by geometry alone, being independent of current levels (not true in the presence of ferromagnetic materials). The consequence of (ii) is that the flux intercepted by windings lying inside the Halbach Array is closely proportional to the area of these windings that lies within the array.

SUMMARY OF THE INVENTION

It is an object of the present invention to provide a fail safe version of the electromechanical battery (EMB) with added power control capabilities.

It is another object of the invention to provide a retractable stator in an EMB module.

It is also an object of the invention to provide a variable coupling generator-motor.

Still another object of the invention is to provide a stator design with knife switch contacts.

Mechanical means are provided to control the voltages induced in the windings of the generator/motor. In one embodiment, a lever is used to withdraw or insert the entire stator windings from the cavity where the rotating field exists. If completely withdrawn, no voltage is induced in the windings, thus eliminating hazards from electrical shorts, either in circuits outside the EMB module, or in the stator windings themselves. If used in an electric vehicle, the EMB modules could be equipped with "fail safe," gravity-activated, linkages that cause the stator to be withdrawn at all times that an "ignition switch" is turned off. Upon turning on that switch an electrical solenoid or other mechanism could be used to raise the stator into operating position. That same mechanism could be arranged to position the stator within the field so as to compensate for the effect of the rotor slowing down.

This invention provides the additional advantage that residual eddy current-induced losses in the stator winding can be eliminated during standby periods. Though small, such losses will occur at all times the windings are in place, even though no power is being drawn from the unit. Such losses would shorten the self-discharge time of the module. However, if the windings were withdrawn those particular losses would be reduced to zero.

In another embodiment, voltage control and/or switching off of the output is achievable with a variable-coupling generator/motor. A stator is made up of two concentric layers of windings, with a larger number of turns on the inner layer of windings than the outer layer of windings. The windings are to be connected in series electrically, that is, their voltages add vectorially. The mechanical arrangement is such that one or both of the windings can be rotated with respect to the other winding about their common central axis. That is, the angular position, say of the inner winding, can be varied relatively to the other winding. In one position, the induced voltages in the two windings are additive, and are equal in magnitude, owing to the larger number of turns on the inner cylinder compared to the outer one. However, if one winding is rotated with respect to the other, the two voltages will no longer be in phase, so that the resultant voltage is lower. When rotated 180° with respect to each other the two voltages will exactly cancel, dropping the output voltage to zero, thus turning the EMB "off".

Another improved design for the stator assembly of electromechanical batteries provides a "fail safe" mode for the stator in the case of either external or internal short circuits that might develop in case of insulation failures or other causes. In this embodiment, knife switch contacts are in electrical contact with the stator windings. The operation of this embodiment depends on the fact that an abnormally large torque will be exerted on the stator structure during any short-circuit condition. The existence of this torque is to be used to accomplish the results that (i) the torque induces a rotation of the stator assembly that disconnects it electrically from the external circuit, either by rupture of its wire leads, or by disengaging contacts of the type used in knife switches and (ii) once disengaged, the stator assembly is allowed to rotate within the vacuum barrier, thus diminishing the voltage induced in its windings, resulting in a limitation of the short-circuit currents.

DETAILED DESCRIPTION OF THE INVENTION

The object of the improvements described herein is to utilize the above described properties of the Halbach Array generator/motor to introduce a mechanical means for controlling and/or turning off the electrical output of an EMB module. In particular, the improvements address two related issues in the use of the EMB. The first of these issues is a problem common to any battery-electrochemical or electromechanical-that stores electrical energy, i.e., how to turn it off. In electrochemical cells the terminals are always "hot," in that if there is a short circuit anywhere in the external circuitry, unless fuses or circuit-breakers are used, the battery will deliver energy to that short, with consequent hazards. However, even if fuses or breakers are used, if there should occur an internal short circuit, the battery may destroy itself by virtue of internal heating at the point of the short. A similar situation exists in the present form of EMB that uses permanent magnets to create a rotating field. This field is used in turn to induce currents in the stator windings from which the output power is derived. External shorts, if not protected by fuses or breakers may have dangerous consequences, and shorts within the windings themselves may destroy those windings through overheating.

The second issue that is addressed by the disclosed improvements has to do with controlling the voltage and/or power output of the EMB by mechanical means. One property of the EMB battery is that its voltage output is directly dependent on the speed of rotation of the rotor. If discharged to half-speed (75 percent depth of discharge) the no-load output of the generator falls to 50 percent of its full-speed value. Some of the embodiments of this invention permit controlling the output voltage of the generator so that it remains nearly constant as the speed is reduced from maximum speed, or, if required, reducing the power output to zero.

Figure 1B:
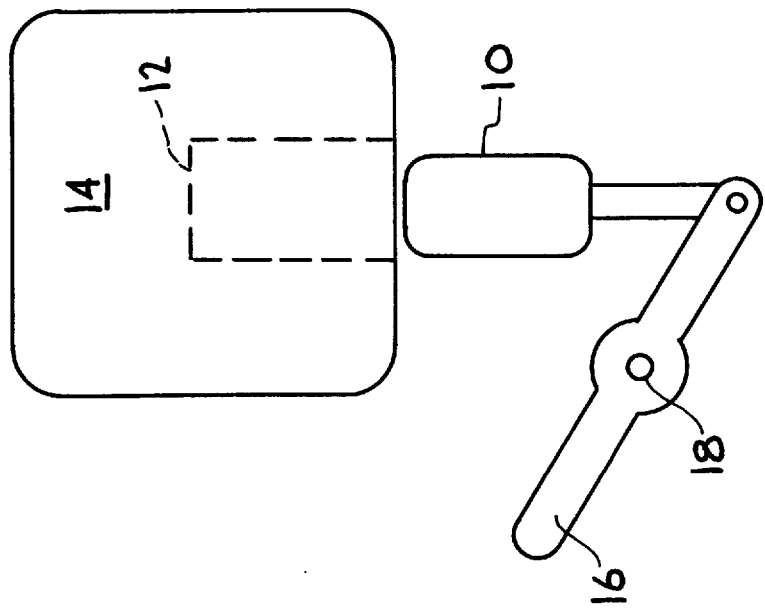
FIGS. 1A and 1B show a retractable stator in an EMB module.
Figure 1A:
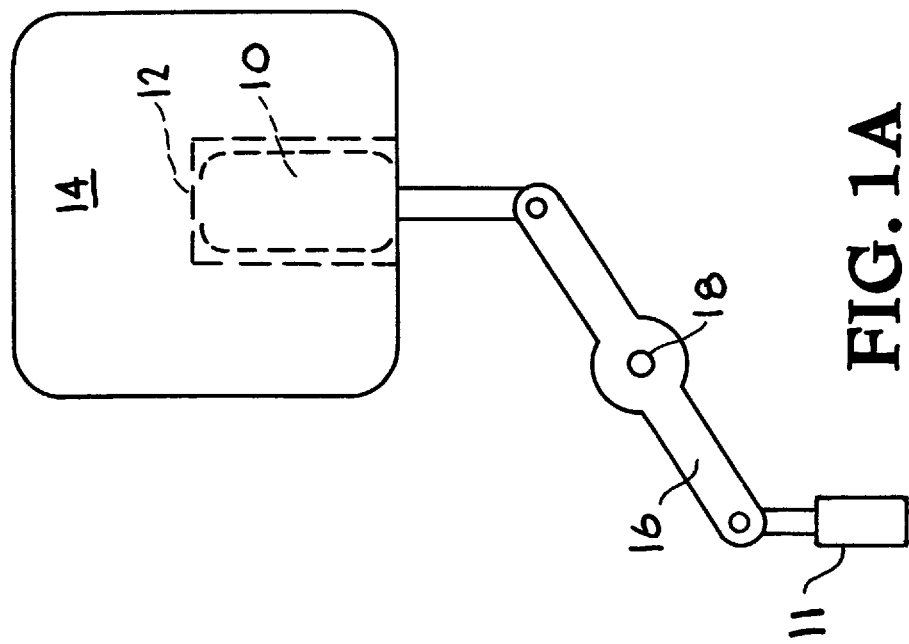

The basic concept behind the improved EMB of the present invention is that mechanical means are used to control the voltages induced in the windings of the generator/motor. Embodiments of a type of generator/motor usable in accordance with the present invention are described in U.S. Pat. No. 5,705,902, entitled "Halbach Array DC Motor/Generator" incorporated herein by reference. The simplest way that voltage control can be accomplished according to the present invention is shown in FIGS. 1A and 1B. Referring to these figures, mechanical means are used for withdrawing or inserting the entire stator windings 10 from the cavity 12 where the rotating field exists. If completely withdrawn, no voltage is induced in the windings 10 and thus there can exist no hazard from electrical shorts, either in circuits outside the EMB module 14, or in the stator windings 10 themselves. FIG. 1 shows a lever 16 attached to a pivot point 18 and then to stator windings 10. Thus, for example, if used in an electric vehicle, the EMB modules could be equipped with "fail safe," gravity-activated, linkages that cause the stator to be withdrawn at all times that an "ignition switch" 11 is turned off. Upon turning on that switch an electrical solenoid (not shown) or other mechanism could be used to raise the stator into operating position. That same mechanism could be arranged to position the stator 10 within the field so as to compensate for the effect of the rotor slowing down. Thus, at full speed, the stator would be partially withdrawn, while as the rotor slowed down (by extraction of energy) the stator would be raised more nearly into full penetration. Such a regulator would ease the task of designing the electronic power-conditioning system that interfaces between the EMB and the vehicle drive motors.

In a vehicular context there would be the additional advantage that residual eddy current-induced losses in the stator winding could be eliminated during standby periods. Though small, such losses will occur at all times the windings are in place, even though no power is being drawn from the unit. Such losses would shorten the self-discharge time of the module. However, if the windings were withdrawn those particular losses would be reduced to zero.

Figure 2:
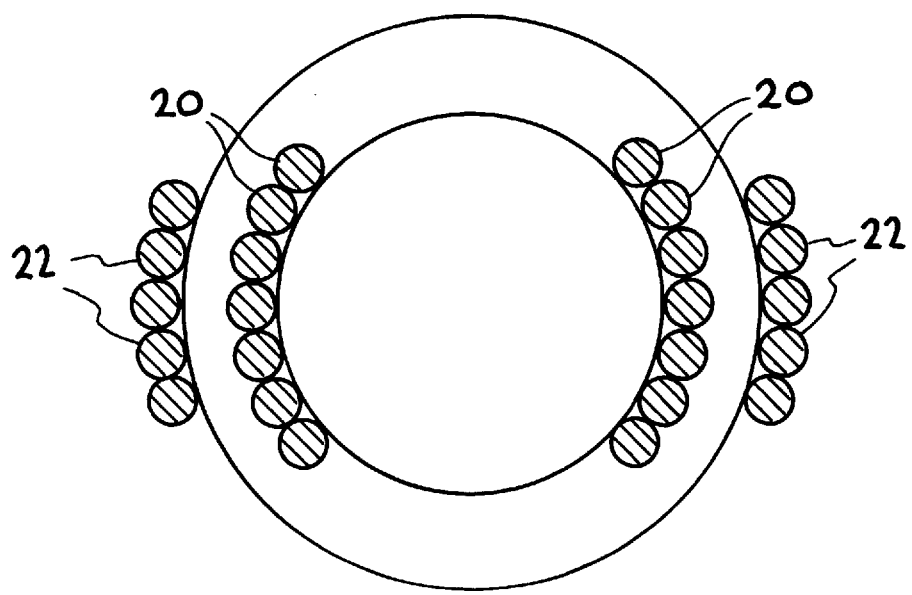
FIG. 2 shows a variable coupling generator-motor.

Voltage control and/or switching off of the output could be achieved with a variable-coupling generator/motor, as shown in FIG. 2. The figure shows a stator that is made up of two concentric layers of windings, with a larger number of turns on the inner layer of windings 20 than the outer layer of windings 22. The windings are to be connected in series electrically, that is, their voltages add vectorially. The mechanical arrangement is such that one or both of the windings can be rotated with respect to the other winding about their common central axis. That is, the angular position, say of the inner winding (winding 20), can be varied relatively to the other winding (winding 22). In the position shown, the induced voltages in the two windings are additive, and are equal in magnitude, owing to the larger number of turns on the inner cylinder compared to the outer one. However, if one winding is rotated with respect to the other, the two voltages will no longer be in phase, so that the resultant voltage is lower. When rotated 180° with respect to each other the two voltages will exactly cancel, dropping the output voltage to zero, thus turning the EMB "off".

In FIG. 2, only a single phase of what might be, for example, a 3-phase winding is shown. The same design concept would obviously carry over into a multi-phase system, however.

Relative to the example shown in FIGS. 1A and 1B, the advantage of FIG. 2 is that little or no increase in overall vertical height of the module would be required to implement the control. The disadvantages are that it may not as easily be made "fail safe" (a spring return might be needed), and that eddy current losses will persist, even in the "off" position.

Figure 3:
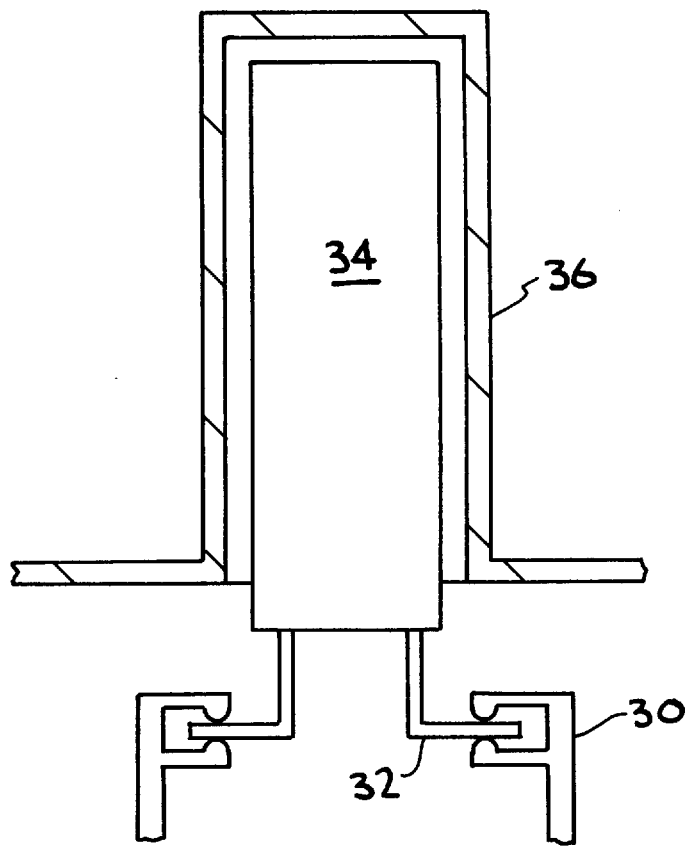
FIG. 3 shows a stator design with knife switch contacts.

FIG. 3 shows another improved design, for the stator assembly of electromechanical batteries provides a "fail safe" mode for the stator in the case of either external or internal short circuits that might develop in case of insulation failures or other causes. Since the rotating field is generated by permanent magnets, there is no way to stop this field from inducing voltages in the stator windings upon command. As a result, the incidence of a short circuit, either in the external circuit, or within the stator windings themselves, could result in very high short circuit currents, delivering large amounts of energy to the windings, with consequent overheating and the possibility of ignition of flammable elements of the stator assembly.

In FIG. 3, knife switch contacts 30 contact electrical connection 32, which is electrically connected to stator windings 34. The figure shows stator windings 34 located within the cavity formed by vacuum barrier 36 which an element of the EMB. The operation of this embodiment depends on the fact that an abnormally large torque will be exerted on the stator structure during any short-circuit condition. The existence of this torque is to be used to accomplish the results that (i) the torque induces a rotation of the stator assembly that disconnects it electrically from the external circuit, either by rupture of its wire leads, or by disengaging contacts of the type used in knife switches and (ii) once disengaged, the stator assembly is allowed to rotate within the vacuum barrier, thus diminishing the voltage induced in its windings, resulting in a limitation of the short-circuit currents.

The first of the above actions would be expected to occur in the event of either an external or an internal short-circuit. The second action would deal with the effects of internal short-circuits, limiting the currents that could flow in such an event.

Changes and modifications in the specifically described embodiments can be carried out without departing from the scope of the invention, which is intended to be limited by the scope of the appended claims.

The invention claimed is:

1. An electric machine, comprising:
   a cylindrical rotor comprising an array of permanent magnets that provide a uniform dipole field with no necessity for the use of laminated iron, wherein said array of permanent magnets comprise bars of identical permanent magnets assembled in a circle, wherein said bars are dipole elements, each bar of said bars having a vector direction of magnetization that rotates at twice the rate as that of a vector rotating about said circle pointing from the center of said uniform dipole field to the center of said elements;

a stator inserted on the axis of said dipole field, said stator comprising windings, wherein said rotor is on the outside of said stator;

means for commutating said windings; and means for disengaging said windings from said uniform dipole field.

2. The electric machine of claim 1, wherein said means for disengaging said windings comprise a retractable stator.

3. The electric machine of claim 2, wherein said retractable stator comprises a lever attached to a pivot point and to said windings, wherein said retractable stator may be inserted into and removed from said uniform dipole field by rotating said lever about said pivot point.

4. The electric machine of claim 3, wherein said retractable stator is gravity-activated.

5. The electric machine of claim 4, further comprising an electrical solenoid for raising said stator into said uniform dipole field.

6. The electric machine of claim 4, further comprising an electrical solenoid for positioning said stator within said uniform dipole field so as to compensate for the effect of the rotor slowing down, wherein at full speed, said stator would be partially withdrawn, wherein as the rotor slowed down (by extraction of energy) said stator would be raised more nearly into full penetration of said uniform dipole field.

7. The electric machine of claim 4, wherein residual eddy current-induced losses in said stator winding are eliminated (reduced to zero) when said windings are withdrawn from said uniform dipole field.

8. The electric machine of claim 1, wherein said means for disengaging said windings comprise a variable-coupling stator.

9. The electric machine of claim 8, wherein said variable-coupling stator comprises two concentric layers of windings comprising an inner layer of windings and an outer layer of windings, wherein said inner layer of windings comprises a larger number of turns than on said outer layer of windings, wherein said inner layer of windings and said outer layer of windings are connected together in series electrically such that their voltages add vectorially, wherein one or both of said inner layer of windings and said outer layer of windings can be rotated with respect to each other about their common central axis, wherein, the angular position, one set of windings of said two concentric layers of windings can be varied relatively to the other set of windings of said two concentric layers of windings.

10. The electric machine of claim 9, wherein said variable-coupling stator comprises a multi-phase system.

11. The electric machine of claim 9, further comprising a spring return, wherein said two concentric layers of windings will automatically return to a position wherein one set of windings is 180 degrees out of phase with respect to the other set of windings such that the output voltage of said windings falls to near-zero.

12. The electric machine of claim 1, wherein said means for disengaging said windings comprise a stator that is electrically coupled to a load through knife-switch contacts.

13. The electric machine of claim 12, wherein said stator further comprises electrical contacts, wherein said knife-switch contacts achieve electrical continuity to said stator through said electrical contacts, wherein in a short-circuit condition there will be exerted on the stator structure a torque which will (i) induce a rotation of the stator assembly that disconnects it electrically from an external circuit, either by rupture of its wire leads, or by disengaging said knife-switch contacts from said electrical contacts and (ii) allow the stator assembly to rotate within a vacuum barrier, thus diminishing the voltage induced in its windings, resulting in a limitation of the short-circuit currents.

* * * * *